US007933717B2

(12) United States Patent
Belenkiy

(10) Patent No.: US 7,933,717 B2
(45) Date of Patent: Apr. 26, 2011

(54) METHOD FOR ELABORATING NAVIGATION PARAMETERS AND VERTICAL OF A PLACE

(75) Inventor: Vladimir Aronovich Belenkiy, Moscow (RU)

(73) Assignees: Federal State Institution "Federal Agency for Legal Protection of Military, Special and Dual Use Intellectual Activity Results" under the Ministry of Justice of the Russian Federation, Moscow (RU); Vladimir Aronovich Belenkiy, Moscow (RU)

( * ) Notice: Subject to any disclaimer, the term of this patent is extended or adjusted under 35 U.S.C. 154(b) by 947 days.

(21) Appl. No.: 11/722,516

(22) PCT Filed: Dec. 21, 2005

(86) PCT No.: PCT/RU2005/000654
§ 371 (c)(1),
(2), (4) Date: Jun. 21, 2007

(87) PCT Pub. No.: WO2006/093430
PCT Pub. Date: Sep. 8, 2006

(65) Prior Publication Data
US 2008/0010017 A1    Jan. 10, 2008

(30) Foreign Application Priority Data

Feb. 21, 2005   (RU) ................................ 2005104599

(51) Int. Cl.
*G01C 21/18* (2006.01)

(52) U.S. Cl. ......................................... 701/220; 701/221
(58) Field of Classification Search .................. 701/200, 701/220, 221; 342/357.03, 357.06, 357.14, 342/357.15, 358
See application file for complete search history.

(56) References Cited

U.S. PATENT DOCUMENTS 4,783,744 A * 11/1988 Yueh ............................. 701/221
5,359,889 A    11/1994 Jircitano et al.

FOREIGN PATENT DOCUMENTS

| EP | 0392104 A1 | 10/1990 |
|---|---|---|
| GB | 1212876 A | 11/1970 |
| RU | 2082098 C1 | 6/1997 |
| RU | 2098765 C1 | 12/1997 |
| RU | 2126136 C1 | 2/1999 |
| RU | 2046289 C1 | 6/2007 |

* cited by examiner

*Primary Examiner* — Richard M. Camby
(74) *Attorney, Agent, or Firm* — patenttm.us

(57) ABSTRACT

The invention concerns the gyroscopic instrument engineering and can be used in determination of main navigation parameters for marine, air and surface vehicle positioning.
Technical result consists in increased accuracy of output parameters, including substantial increase of the vehicle heading generation accuracy as well as principal improvement of dynamic properties of output parameter generation. To achieve these results control signals of gyro platforms or gyro platform models are generated under the condition that in the absence of ballistic deviations, autonomously, a natural period of the gyro platforms or the gyro platform models differ from Schuler period.

8 Claims, 4 Drawing Sheets

METHOD FOR ELABORATING NAVIGATION PARAMETERS AND VERTICAL OF A PLACE

Figure 1:
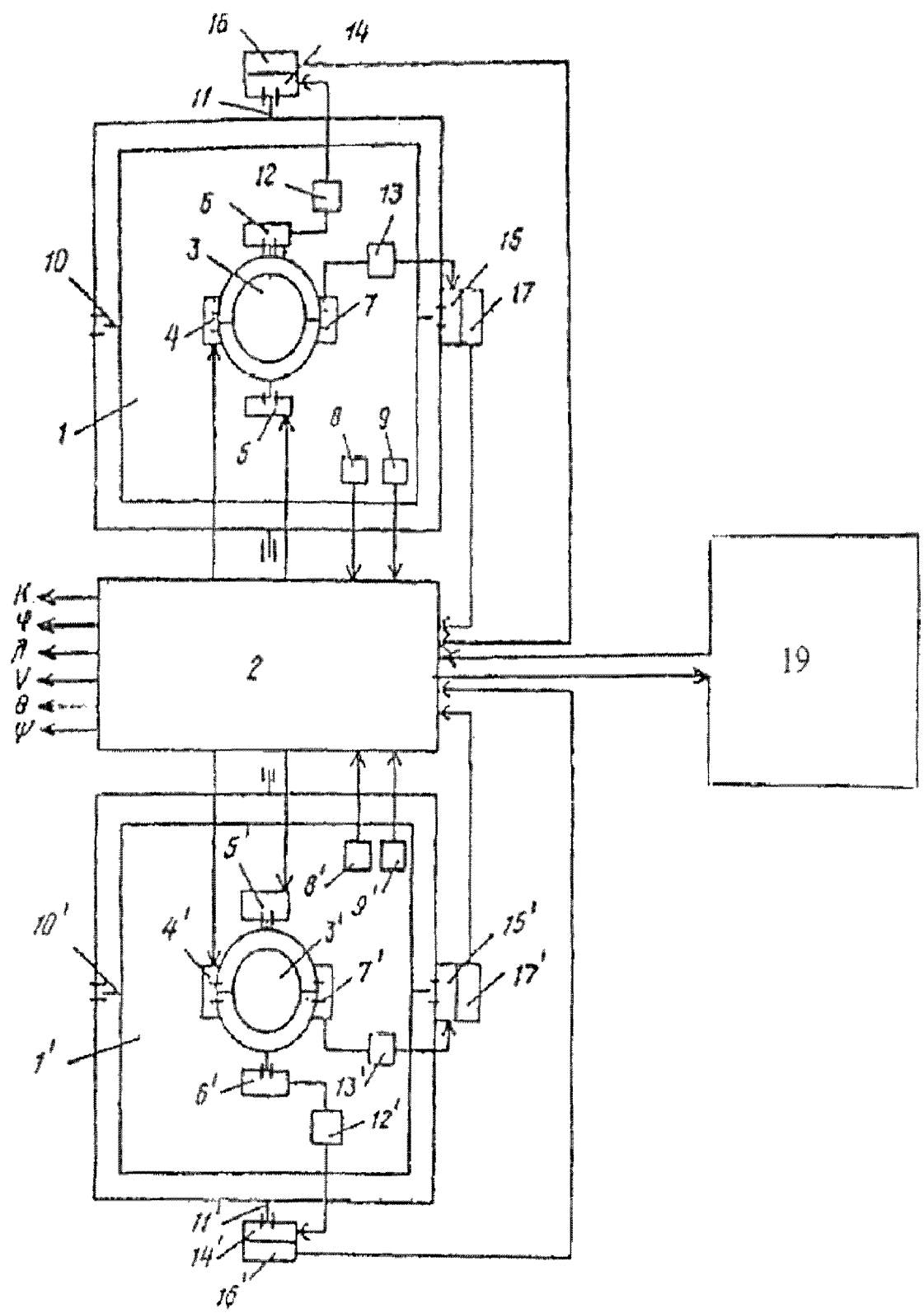

The invention concerns the gyroscopic instrument engineering and can be used in navigation of marine, airborne and surface vehicles.

Well-known is the method of navigation parameters and position vertical generation. This method includes measurement of specific force components using accelerometers, sensitivity axes of which are connected with a gyro platform; generation of gyro platform control signals; following to indicate the generated signals by means of a gyroscope or absolute angular rate sensors [1]. Otherwise this method may include measurement of specific force components using accelerometers; measurement of signals from gyros or absolute angular rate sensors, sensitivity axes of which are directed along axes of instrumental trihedral; analytical solution of the orientation problem by means of inertial system operation simulation [2]; generation of navigation parameters and position vertical.

The disadvantage of this method consists in limited capabilities of accuracy and dynamic characteristics.

The purpose of the invention is increase of accuracy characteristics and enhancement of dynamic capabilities of the method.

The technical effect is achieved in such a way:
control signals of a gyro platform or a model of the gyro platform of the inertial system with linear correction are generated under the condition that in the absence of ballistic deviations a natural period of the gyro platform or the gyro platform model differs from Schuler period;
control signals of gyro platforms or models of gyro platforms of the inertial system with linear correction are generated to provide, in the absence of ballistic deviations, either nonlinear relation between a value of speed deviation and a value of horizontal component of the vehicle absolute angular rate, or the relation of $$\alpha = \frac{n}{\omega_0} \frac{V}{R}$$

type at small values of speed deviations, with which relations tg$\alpha$=sin $\alpha$=$\alpha$ are admissible;
asymptotic stability (autonomous damping) of each inertial system or each inertial system model, including (if necessary) the inertial system with integral correction, is provided using differences of the similar data generated by inertial systems with linear correction, as well as the inertial system with integral correction (if necessary), or their models with different natural periods and (or) using values of observable generalized coordinates of the system or its model;
estimation of instrumental errors is provided using differences of the similar data generated by inertial systems with linear corrections, as well as the inertial system with integral correction (if necessary), or their models with different natural periods (with different parameters "n") and in different modes;
accuracy of the vehicle heading generation is increased and readiness time is reduced due to increasing directing force to the compass meridian in the inertial system with linear correction.

The maximum effect in estimation of instrumental errors and improvement of dynamic behavior of the system is provided by analytical solution of the orientation problem in a strapdown system. In this case the similar data from different models of simultaneously operating inertial systems with different parameters and in different modes are compared.

We can present several examples of inertial systems for implementation of the method: an inertial system with linear correction with a gyro platform in two-axis and three-axis gimbals; an inertial system with linear correction in joint operation with an inertial system with integral correction; a strapdown inertial system.

The drawing presents a functional block diagram of the inertial system for implementation of the method (see FIG. 1).

Figure 2:
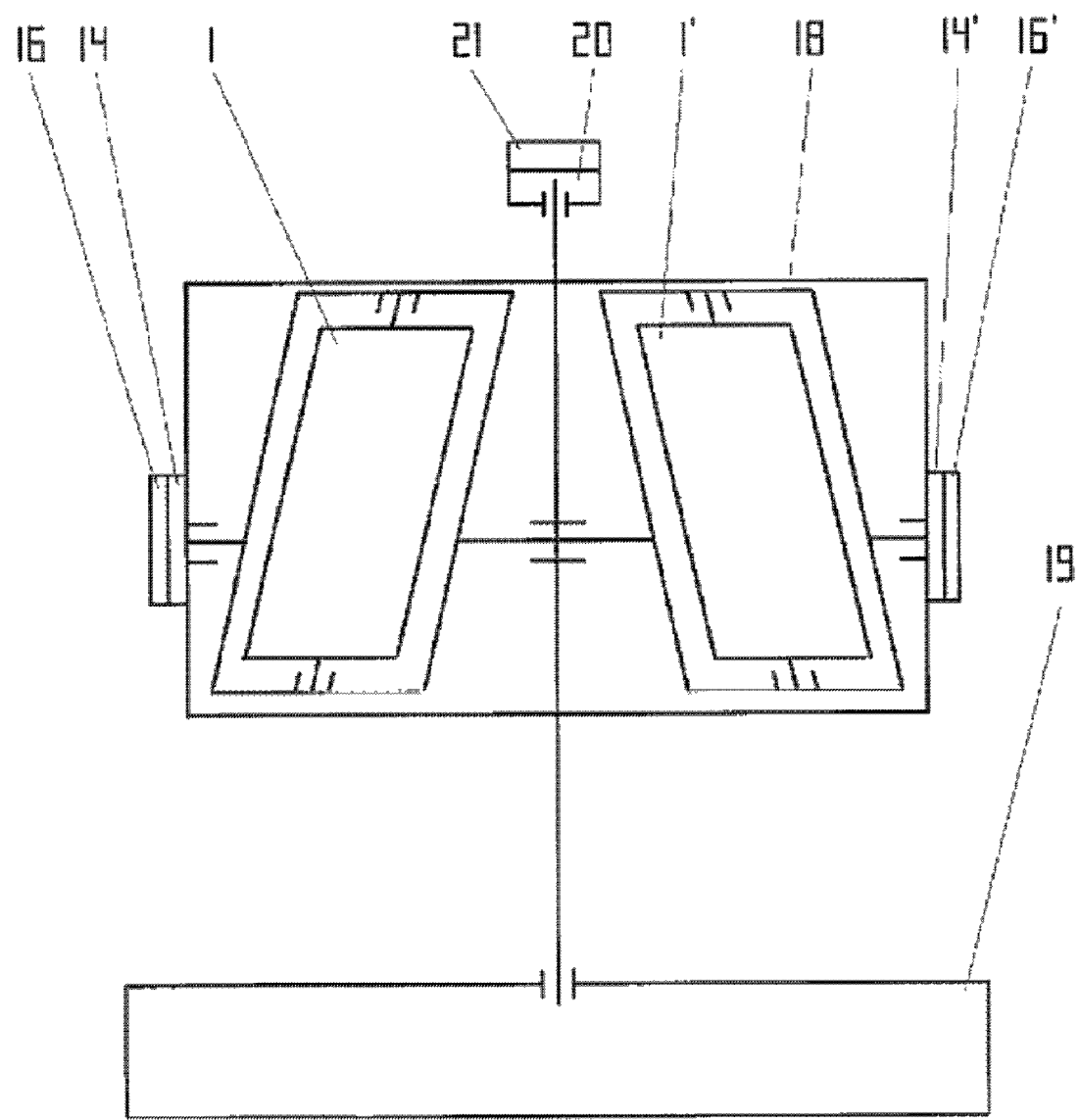
Figure 3:
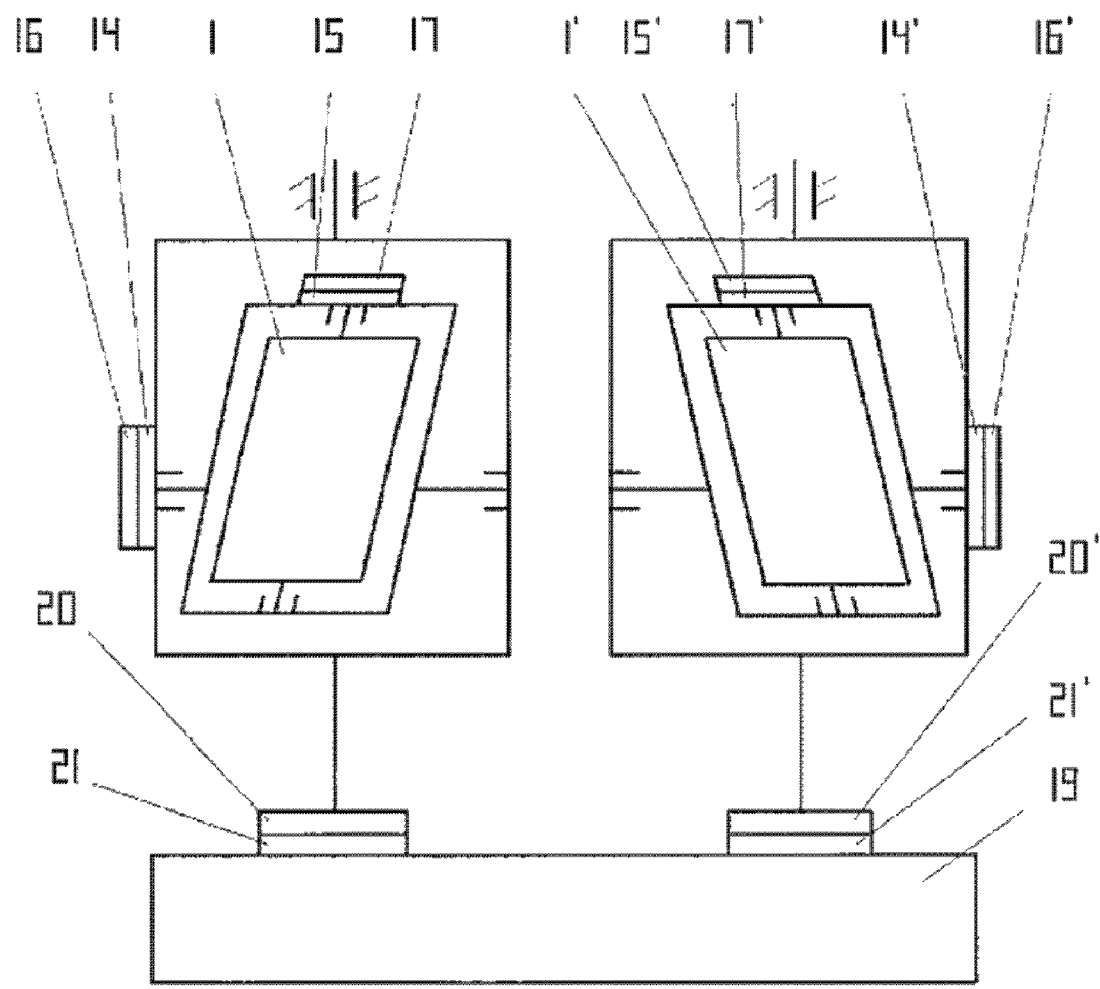
Figure 4:
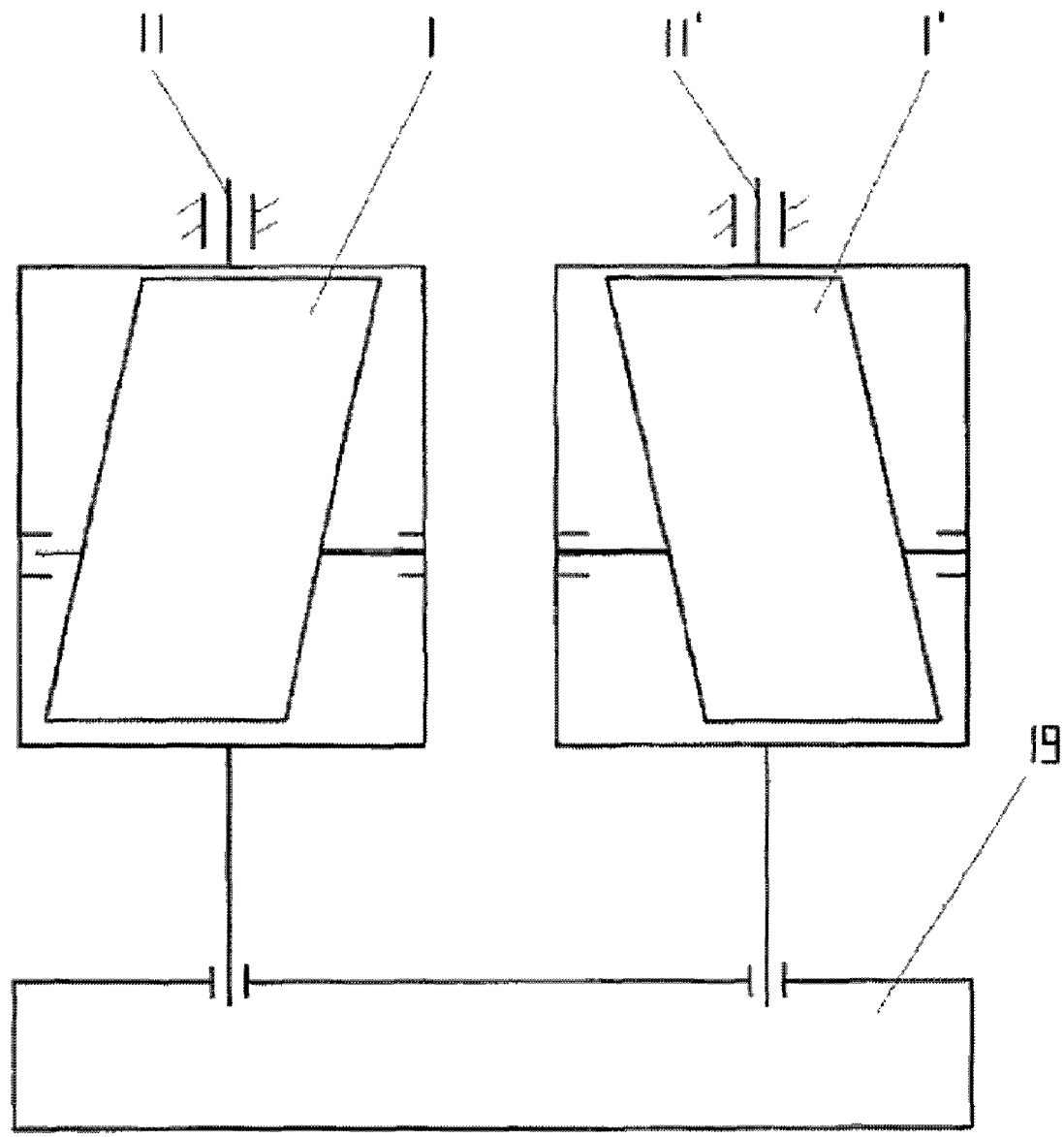

FIGS. 2, 3, 4 show the schemes of gyro platforms with different gimbal types. FIGS. 2 and 3 show the schemes of the gyro platforms in three-axis gimbal. FIG. 4 shows the scheme of the gyro platform in two-axis gimbal.

The inertial system with linear correction, which is under consideration (FIG. 1, FIG. 2, FIG. 3), consists of two structurally identical stabilized gyro platforms 1 and 1' and unit 2—a unit of control and output parameter generation. One two-degree-of-freedom gyroscope (3 and 3') is located on each stabilized gyro platform. And with this, angular momentums of the gyros are perpendicular to the planes of the stabilized gyro platforms. Gyroscopes have torquers 4, 5 and 4', 5' and angular pick-offs 6, 7 and 6', 7'. Besides, accelerometers 8, 9 and 8', 9' are mounted on each stabilized gyro platform. Accelerometer sensitivity axes on each gyro platform are orthogonal between each other and are parallel to the gyro platform plane. The axis of one accelerometer is parallel to the inner axis of the gyro platform gimbal. The outer axes of gimbals 11 and 11' are installed in the common gimbal ring 18 (see FIG. 2). The axis of the common gimbal ring is installed on the horizon-stabilized platform 19 of the inertial system with integral correction. Axes 11 and 11' are parallel to the plane of the stabilized platform 19 and are parallel to each other. Motor 20 and heading sensor 21 are located on the common gimbal ring axis. Angular pick-offs 16 and 16', measuring speed deviations $\alpha_1$ and $\alpha_2$, are also located on the common ring 18.

By means of amplifiers 12, 13 and 12', 13' outputs of angular pick-offs 6, 7 and 6', 7' of gyroscopes 3 and 3' are connected with inputs of motors 14, 15 and 14', 15', which are connected with the gimbal axes. Angular pick-offs 16, 17 and 16', 17' are connected with the same axes. Inputs of torquers 4, 5 and 4', 5' of gyros 3 and 3' are connected with the corresponding outputs of control and output parameter generation unit 2. Outputs of accelerometers 8, 9 and 8', 9' and angular pick-offs 16, 17 and 16', 17' are connected with the corresponding inputs of unit 2. Unit 2 has data communication with the inertial system with integral correction.

Outputs of unit 2 for users are K—vehicle heading, $\phi$—latitude, $\lambda$—longitude, $\theta$ and $\psi$—roll and pitch angles.

The proposed system operates as follows. With the help of motors 14, 15 and 14', 15' respectively by error signals from angular pick-offs 6, 7 and 6', 7' of gyros 3 and 3' each gyro platform is constantly kept in one plane with the gyro housing.

The housing of each gyro together with the gyro platform is brought to the position corresponding to the prescribed value of speed deviation for the given gyro platform with the help of torques applied via torquers 4, 5 and 4', 5' of gyros 3 and 3' by control currents by signals generated in unit 2. Since the prescribed values of speed deviations are different for each gyro platform, differences in readings of angular pick-offs 16 and 16' are the initial data sources for determination of horizontal component of absolute angular rate of Darboux trihedral. Using servo motor 20 the plane of the common gimbal ring 18 is constantly kept in direction perpendicular to the plane of compass meridian.

Let's choose Darboux $E_0N_0\zeta_0$ moving trihedral, axis $ON_0$ of which is oriented by the horizontal component of absolute angular rate V/R, as the initial coordinate system.

Then projections of absolute angular rate of the trihedral $E_2N_2\zeta_2$ on its axes will be 0; V/R; r. Projections of trihedral vertex acceleration $E_0N_0\zeta_0$ on its axes $OE_0$ and $ON_0$ are $\dot{V}$; rV.

Projection of gravity acceleration on axis $O\zeta_0$ will be $$-g = -\left(g_0 - \frac{V^2}{R}\right).$$

For the schemes in FIGS. 2 and 3 let the right coordinate system $E_1N_1\zeta_1$ be rigidly bound with the gyro housing of the first gyro platform. Let coordinate system $E_2N_2\zeta_2$ be rigidly bound with the gyro housing of the second gyro platform. Coordinate system $E_1N_1\zeta_1$ will be obtained by turning around axis $OE_0$ at angle $\alpha_1$ and around auxiliary axis $ON_1'$ at angle $\beta_1$. Coordinate system $E_2N_2\zeta_2$ will be obtained by turning around axis $OE_0$ at angle $\alpha_2$ and around auxiliary axis $ON_2'$ at angle $\beta_2$.

Projections of absolute angular rate of trihedrals $E_1N_1\zeta_1$ and $E_2N_2\zeta_2$ on their axes $OE_1$; $ON_1$; $OE_2$; $ON_2$, taking account of gyro drifts, will be $$\Omega_{E1} = \dot{\alpha}_1 + \left(\frac{V}{R}\sin\alpha_1 - r\cos\alpha_1\right)\beta_1 + \Delta p_1$$

$$\Omega_{N1} = \dot{\beta}_1 + \frac{V}{R}\cos\alpha_1 + r\sin\alpha_1 + \Delta q_1$$

$$\Omega_{E2} = \dot{\alpha}_2 + \left(\frac{V}{R}\sin\alpha_2 - r\cos\alpha_2\right)\beta_2 + \Delta p_2$$

$$\Omega_{N2} = \dot{\beta}_2 + \frac{V}{R}\cos\alpha_2 + r\sin\alpha_2 + \Delta q_2$$

where $\Delta p_1$; $\Delta p_2$; $\Delta q_1$; $\Delta q_2$—gyro drifts.

Accelerometer signals by axes $OE_1$; $ON_1$ and axes $OE_2$; $ON_2$ will be the following:

$$W_{E1} = -\dot{V} - (rV\sin\alpha_1 - g\cos\alpha_1)\beta_1 + \Delta W_{E1}$$

$$W_{N1} = -(rV\cos\alpha_1 + g\sin\alpha_1) + \Delta W_{N1}$$

$$W_{E2} = -\dot{V} - (rV\sin\alpha_2 - g\cos\alpha_2)\beta_2 + \Delta W_{E2}$$

$$W_{N2} = -(rV\cos\alpha_2 + g\sin\alpha_2) + \Delta W_{N2}$$

where $\Delta W_{E1}$; $\Delta W_{N1}$; $\alpha W_{E2}$; $\alpha W_{N2}$—accelerometer errors.

In order to provide the gyro platform natural period that differs from Schuler period, invariant values of speed deviations can be as follows, for example:

$$tg\alpha_1 = \frac{n_1}{\omega_0}\frac{V}{R}; \quad tg\alpha_2 = \frac{n_2}{\omega_0}\frac{V}{R} \quad \text{or}$$

$$\sin\alpha_1 = \frac{n_1}{\omega_0}\frac{V}{R}; \quad \sin\alpha_2 = \frac{n_2}{\omega_0}\frac{V}{R} \quad \text{or}$$

have the form of other nonlinear relations between a value of speed deviation $\alpha$ and a value of horizontal component of absolute angular rate V/R, where
$\omega_0$—Schuler frequency;
$n_1$; $n_2$—system parameters.

As an example, let us consider the behavior of the inertial system with linear correction for the case $$tg\alpha_1 = \frac{n_1}{\omega_0}\frac{V}{R}; \quad tg\alpha_2 = \frac{n_2}{\omega_0}\frac{V}{R}.$$

Let's assume that $n_2 = -n_1 = n$.

In order to provide invariant values of speed deviations for this case, gyro control signals can have the form, for example, $$\Omega_{E1con.} = \frac{n}{\omega_0}\left(\frac{W_{E1}}{R} + \frac{\dot{V}_{dev.}}{R}\sin^2\alpha_{dev.}\right);$$

$$\Omega_{E2con.} = -\frac{n}{\omega_0}\left(\frac{W_{E2}}{R} + \frac{\dot{V}_{dev.}}{R}\sin^2\alpha_{dev.}\right);$$

$$\Omega_{N1con.} = \frac{\omega_0}{n}\sin\alpha_{dev.} + \frac{n}{\omega_0}\frac{(W_{N1} + W_{N2})}{2R};$$

$$\Omega_{N2con.} = \frac{\omega_0}{n}\sin\alpha_{dev.} - \frac{n}{\omega_0}\frac{(W_{N1} + W_{N2})}{2R}$$

where
$2\alpha_{dev.} = \alpha_2 - \alpha_1$—difference in readings of angular pick-offs 16' and 16;

$$\frac{\omega_0}{n}\sin\alpha_{np} = \frac{V_{np}}{R}\cos\alpha_{np};$$

$$\frac{n}{\omega_0}\frac{\dot{V}_{np}}{R} = \frac{\dot{\alpha}_{np}}{\cos^2\alpha_{np}}.$$

The system operation equations will be the following:

$$\Omega_{E1} = \Omega_{E1con.} \quad \Omega_{E2} = \Omega_{E2con.}$$

$$\Omega_{N1} = \Omega_{N1con.} \quad \Omega_{N2} = \Omega_{N2con.}$$

The equations of gyro platform errors or gyro platform model errors, with allowance for the influence of members with vertical component of absolute angular rate r and gyro platform turn around the angular momentum axis at angle $\Delta K \cos\alpha$ as a result of motor 20 action, will be the following:

$$\frac{-\Delta\tilde{\alpha}}{\cos^2\alpha} + \frac{r}{\cos\alpha}\tilde{\beta} - n\omega_0\cos\alpha\tilde{\beta} = \Delta\tilde{p} + \frac{n}{\omega_0 R}\Delta\hat{W}_E \quad (1)$$

$$-\hat{\tilde{\beta}} - r\cos\alpha\Delta\hat{\alpha} + \frac{\omega_0}{n\cos\alpha}\Delta\hat{\alpha} = \Delta\hat{q}$$

$$-\tilde{\tilde{\beta}} - \frac{r}{\cos\alpha}\Delta\tilde{\alpha} + n\omega_0\cos\alpha\Delta\tilde{\alpha} = \Delta\tilde{q} + \frac{n}{\omega_0 R}\Delta\hat{W}_N$$

$$-\Delta\hat{\alpha} + \frac{r}{\cos\alpha}\hat{\beta} - n\omega_0\cos\alpha\hat{\beta} =$$

$$\Delta\hat{p} + \frac{n}{\omega_0 R}\Delta\tilde{W}_E + (1-n^2)\cos^2\alpha\frac{V}{R}\Delta K$$

where $$\frac{\Delta\alpha_2 - \Delta\alpha_1}{2} = \Delta\tilde{\alpha}; \quad \frac{\Delta\alpha_2 + \Delta\alpha_1}{2} = \Delta\hat{\alpha}; \quad \frac{\beta_2 + \beta_1}{2} = \hat{\beta}; \quad \frac{\beta_2 - \beta_1}{2} = \tilde{\beta};$$

$$\frac{\Delta p_2 - \Delta p_1}{2} = \Delta\tilde{p}; \quad \frac{\Delta p_2 + \Delta p_1}{2} = \Delta\hat{p}; \quad \frac{\Delta q_2 - \Delta q_1}{2} = \Delta\tilde{q}; \quad \frac{\Delta q_2 + \Delta q_1}{2} = \Delta\hat{q};$$

-continued $$\frac{\Delta W_{E2} - \Delta W_{E1}}{2} = \Delta \tilde{W}_E; \quad \frac{\Delta W_{E2} + \Delta W_{E1}}{2} = \Delta \hat{W}_E; \quad \frac{\Delta W_{N2} + \Delta W_{N1}}{2} = \Delta \hat{W}_N$$

$$\frac{\beta_2 - \beta_1}{2} = \tilde{\beta}$$

observable generalized coordinate.

In the strapdown variant measurement $(\beta_2-\beta_1)$, as well as measurement $(\alpha_2-\alpha_1)$, are obtained by estimating deflection of the instrumental vertical of each gyro platform of the inertial system with linear correction from the direction of the geocentric vertical of the inertial system with integral correction in the form of angles $\beta$ and $\alpha$.

Assuming that $$\Delta\Omega_{N0} = \frac{\omega_0 \Delta\tilde{\alpha}}{n\cos^2\alpha_2}; \quad \Delta\Omega_{E0} = \Omega_{N0} \frac{\tilde{\beta}}{\sin\alpha_2}; \quad \tilde{\beta}_1 = \frac{\hat{\beta}}{\cos\alpha_2},$$

where $\Delta\Omega_{N0}$; $\Delta\Omega_{E0}$—errors in generation of horizontal components of absolute angular rate of the vehicle;

$\hat{\beta}_1$—stabilization error of the horizon plane around axis $ON_0$, we'll obtain equation set (1) in more convenient form:

$$-\Delta\dot{\Omega}_{N0} + r\Delta\Omega_{E0} - (\omega_0^2 \cos^2\alpha_2)\hat{\beta}_1 = \frac{\Delta\tilde{p}\omega_0}{n} + \frac{\Delta\hat{W}_E}{R}; \quad (2)$$

$$-\dot{\hat{\beta}}_1 - r\Delta\tilde{\alpha} + \Delta\Omega_{N0} = \frac{\Delta\tilde{q}}{\cos\alpha_2};$$

$$-\Delta\dot{\Omega}_{E0} - r\Delta\Omega_{N0} + \omega_0^2 \Delta\tilde{\alpha} = \frac{\Delta\tilde{q}\omega_0}{n\cos\alpha_2} + \frac{\Delta\hat{W}_N}{R\cos\alpha_2};$$

$$-\Delta\dot{\tilde{\alpha}} + r\hat{\beta}_1 - n^2\cos^2\alpha_2\Delta\Omega_{E0} = \Delta\hat{p} + \frac{n\Delta\tilde{W}_E}{\omega_0 R} + (1-n^2)\cos^2\alpha\frac{V}{R}\Delta K$$

For the strapdown variant $\Delta\tilde{p}=0$; $\Delta\tilde{q}=0$; $\Delta\tilde{W}_E=0$.

As it follows from these equations, the natural frequencies of the system $\omega_0 \cos\alpha$ and $n\omega_0 \cos\alpha$ differ from Schuler frequency $\omega_0$.

$n\omega_0 \cos\alpha$—directing force to the meridian.

The plane of ring 18 can be maintained perpendicularly to the compass meridian, controlling motor 20 in the following modes:

1) $\dot{K}=F(\beta_2-\beta_1)$ where $\dot{K}$—speed of motor 20 control action in response to a signal, F—transfer function.

2) controlling in response to a signal from compass heading generated by the inertial system with integral correction;

3) controlling in response to a compass heading signal from the external heading indicator.

By measurement $(\beta_2-\beta_1)$ or by $\Delta\Omega_{E0}$ we can estimate the eastern drift of the gyroscopic unit of the strapdown inertial system or determine an error of compass heading reproduced by motor 20 accurate to $$\Delta\Delta K = -\frac{\Delta\hat{p}}{\frac{V}{R}(n\cos\alpha)^2}.$$

The observed generalized coordinate $(\beta_2-\beta_1)$ or $\Delta\Omega_{E0}$ make it possible to introduce autonomously the dissipative forces into system control signals and thus provide autonomous damping—asymptotic stability of the system.

It can be shown that using the estimates of angles $\beta_2$ and $\beta_1$, as well as the accelerometer readings $W_{E1}$; $W_{E2}$ and $W_{E_{IS}}$ it is possible to measure the observable generalized coordinates $\hat{\beta}$ and $\beta_{IS}$, where $\beta_{IS}$—an error in stabilization of gyro horizon of the inertial system with integral correction, $W_{E_{IS}}$—a reading of the corresponding accelerometer of the inertial system with integral correction.

FIG. 4 presents the block diagram of an inertial system with linear correction with gyro platforms in two-axis gimbal suspension.

Let the right coordinate systems $E_1N_1\zeta_1$ and $E_2N_2\zeta_2$ be bound with the gyro platforms. Coordinate systems $E_1N_1\zeta_1$ and $E_2N_2\zeta_2$ will be obtained from coordinate system $E_0N_0\zeta_0$ by turning sequentially:

1) around axis $O\zeta_0$ at angles $\Delta K_1$ and $\Delta K_2$, respectively;
2) around axes $OE_1$ and $OE_2$ at angles $\alpha_1$ and $\alpha_2$, respectively.

Projections of absolute angular rate of trihedrals $E_1N_1\zeta_1$ and $E_2N_2\zeta_2$ on their axes will be the following, with allowance for gyro drifts:

$$\Omega_{E1} = \dot{\alpha}_1 + \frac{V}{R}\Delta K_1 + \Delta p_1$$

$$\Omega_{N1} = \Delta\dot{K}_1\sin\alpha_1 + \frac{V}{R}\cos\alpha_1 + r\sin\alpha_1 + \beta_{IS}\cos\alpha_1 + \Delta q_1$$

$$\Omega_{E2} = \dot{\alpha}_2 + \frac{V}{R}\Delta K_2 + \Delta p_2$$

$$\Omega_{N2} = \Delta\dot{K}_2\sin\alpha_2 + \frac{V}{R}\cos\alpha_2 + r\sin\alpha_2 + \beta_{IS}\cos\alpha_2 + \Delta q_2$$

Accelerometer signals along axes $OE_1$; $ON_1$ and axes $OE_2$; $ON_2$ will be the following:

$W_{E1}=-\dot{V}-rV\Delta K_1+g\beta_{IS}+\Delta W_{E1}$ $W_{N1}=-(rV\cos\alpha_1+g\sin\alpha_1)+\Delta W_{N1}$ $W_{E2}=-\dot{V}-rV\Delta K_2+g\beta_{IS}+\Delta W_{E2}$ $W_{N2}=-(rV\cos\alpha_2+g\sin\alpha_2)+\Delta W_{N2}$ In order to fulfill the conditions $$tg\alpha_1 = -\frac{n}{\omega_0}\frac{V}{R} \quad \text{and} \quad tg\alpha_2 = \frac{n}{\omega_0}\frac{V}{R}$$

we'll define the following expressions for control signals of the gyroscopes of the first and the second gyro pendulums:

$$\Omega_{E1con.} = \frac{n}{\omega_0}\left(\frac{W_{E1}}{R} + \frac{\dot{V}_{dev.1}}{R}\sin^2\alpha_{dev.1}\right)$$

$$\Omega_{N1con.} = -\frac{\omega_0}{n}\sin\alpha_{dev.1} + \frac{n}{\omega_0}\frac{(W_{N1} + g\sin\alpha_{dev.1})}{R}$$

-continued $$\Omega_{E2con.} = \frac{n}{\omega_0}\left(\frac{W_{E2}}{R} + \frac{\dot{V}_{dev.2}}{R}\sin^2\alpha_{dev.2}\right)$$

$$\Omega_{N2con.} = \frac{\omega_0}{n}\sin\alpha_{dev.2} - \frac{n}{\omega_0}\frac{(W_{N2} + g\sin\alpha_{dev.2})}{R}$$

where $$\frac{n}{\omega_0}\frac{\dot{V}_{dev.1}}{R} = \frac{\dot{\alpha}_{dev.1}}{\cos^2\alpha_1};\ \frac{n}{\omega_0}\frac{\dot{V}_{dev.2}}{R} = \frac{\dot{\alpha}_{dev.2}}{\cos^2\alpha_2};$$

$$\alpha_{dev.1} = \alpha_1 - \Delta\alpha_{IS};\ \alpha_{dev.2} = \alpha_2 - \Delta\alpha_{IS}.$$

Then the equations of motion (operation) of two gyro platforms will be the following:

$$\Omega_{E1} = \Omega_{E1con.}\ \Omega_{E2} = \Omega_{E2con.}$$

$$\Omega_{N1} = \Omega_{N1con.}\ \Omega_{N2} = \Omega_{N2con.}$$

The error equations for the strapdown inertial system with linear correction will have the form:

$$-\Delta\dot{\hat{\Omega}}_N + r\Delta\hat{\Omega}_E - \frac{\omega_0}{n}\Delta\tilde{\Omega}_E = \omega_0^2\frac{\Delta W_E}{g} + \omega_0^2\beta_{IS}$$

$$-\Delta\dot{\tilde{\Omega}}_N + r\Delta\tilde{\Omega}_E - \frac{\omega_0}{n}\Delta\tilde{\Omega}_E = \frac{\omega_0}{n}\Delta p + \frac{\omega_0}{n}tg^2\alpha\Delta\dot{\alpha}_{IS}$$

$$-\Delta\dot{\hat{\Omega}}_E - r\Delta\hat{\Omega}_N + \frac{\omega_0}{n}\Delta\tilde{\Omega}_N = \frac{\omega_0}{n}\frac{\Delta q}{\cos\alpha} + \frac{\omega_0}{n}\beta_{IS}$$

$$-\Delta\dot{\tilde{\Omega}}_E - r\Delta\hat{\Omega}_N + \frac{\omega_0}{n}\Delta\tilde{\Omega}_N = \frac{\omega_0^2\Delta W_N}{g\cos\alpha} - \omega_0^2\left(1 - \frac{1}{n^2}\right)\Delta\alpha_{IS}$$

where $$\Delta\hat{\Omega}_N = \frac{\omega_0}{2n}\frac{(\Delta\alpha_2 - \Delta\alpha_1)}{\cos^2\alpha};\ \Delta\hat{\Omega}_E = \frac{V}{R}\Delta\left(\frac{K_2 + K_1}{2}\right);$$

$$\Delta\tilde{\Omega}_N = \frac{\omega_0}{2n}\frac{(\Delta\alpha_2 + \Delta\alpha_1)}{\cos^2\alpha};\ \Delta\tilde{\Omega}_E = \frac{V}{R}\frac{(K_2 - K_1)}{2};$$

$\Delta\tilde{\Omega}_E$—observed generalized coordinate.

With the relevant control signals the equations for free oscillations for inertial system in two-axes gimbal will be the following:

$$-\Delta\dot{\hat{\Omega}}_N + r\Delta\hat{\Omega}_E - \left(P_1 + \frac{\omega_0}{n}\right)\Delta\tilde{\Omega}_E = 0$$

$$-\Delta\dot{\tilde{\Omega}}_N + (P_2 + r)\Delta\tilde{\Omega}_E - \frac{\omega_0}{n}\Delta\hat{\Omega}_E = 0$$

$$-\Delta\dot{\hat{\Omega}}_E + P_3\Delta\tilde{\Omega}_E - r\Delta\tilde{\Omega}_N + \frac{\omega_0}{n}\Delta\tilde{\Omega}_N = 0$$

$$-\Delta\dot{\tilde{\Omega}}_E - r\Delta\hat{\Omega}_N + \frac{\omega_0}{n}\Delta\hat{\Omega}_N + P_4\Delta\tilde{\Omega}_E = 0$$

where
P1; P2; P3; P4—transfer functions.
If we take P1; P2; P3; P4 as constant values, we can obtain a characteristic equation in the following form:

$$\Delta = S^4 + b_3S^3 + b_2S^2 + b_1S + b_0,$$

where $b_0; b_1; b_2; b_3$—the constants independent of each other.

Thus autonomous damping can be provided—asymptotic stability of Schuler loop of the inertial system.

With the strapdown version of joint operation of the inertial system with linear correction and the inertial system with integral correction we obtain a multiparameter autonomous set of inertial systems, because simultaneous operation of several inertial systems can be virtually provided in different modes with different dynamic properties, which also ensure asymptotic stability of the system with different parameters n, hence with different values of speed deviation α. This condition allows instrumental errors of SINS sensors to be estimated continuously during operation, comparing the similar generated output values of different systems between each other.

As an example, let us consider the mechanism of estimating the most vulnerable component of gyro system drift—drift around the vertical axis—$\Delta r$ (see equations (3)). Let's assume $$\Delta\Omega_{N0} = \frac{\Delta\hat{q}}{\cos\alpha_2},\ \text{then}\ \Delta r_{dev.} = \frac{\Omega_{N0_2} - \Omega_{N0_1}}{tg\alpha_2 - tg\alpha_1},$$

where
$\Delta r_{dev.}$—an estimate of strapdown gyro system drift around the vertical axis;
$\Omega_{N0_2}; \Omega_{N0_1}$—values of horizontal components of absolute angular rate of the vehicle, generated by two inertial systems with linear correction with different values of parameter n.

The invention claimed is:

1. A method of generation of navigation parameters and vertical position comprising:
    measuring specific force components using accelerometers, wherein sensitivity axes of said accelerometers are connected with a gyro platform; generating gyro platform control signals; following to indicate the generated signals using a gyro or an absolute angular rate sensors, and wherein control signals of the gyro platform or a model of the gyro platform of the inertial system with linear correction are generated under the condition that in the absence of ballistic deviations a natural period of the gyro platform or the gyro platform model differs from a Schuler period.

2. The method of generation of navigation parameters and position vertical according to claim 1, further comprising:
    providing asymptotic stability (autonomous damping) of each inertial system or each inertial system model, using differences of the similar data generated by the inertial systems or their models with different natural periods.

3. The method of generation of navigation parameters and position vertical according to claim 1, further comprising:
    providing estimation of instrumental errors using differences of the similar data generated by inertial systems or their models with different natural periods, including different parameters n.

4. The method of generation of navigation parameters and position vertical according to claim 1, wherein:
    accuracy of the vehicle heading generation is increased and the system readiness time is reduced due to increasing directing force to the compass meridian.

5. A method of generation of navigation parameters and vertical position comprising:
    measuring specific force components using accelerometers; measuring signals from gyros or absolute angular rate sensors, wherein sensitivity axes of said gyros or absolute angular rate sensors are directed along axes of the instrumental trihedral; analytically solving the orientation problem by means of inertial system operation simulation; generating navigation parameters and vertical position, and wherein control signals of the gyro platform or a model of the gyro platform of the inertial system with linear correction are generated under the condition that in the absence of ballistic deviations a natural period of the gyro platform or the gyro platform model differs from a Schuler period.

6. The method of generation of navigation parameters and position vertical according to claim 5, further comprising:

providing asymptotic stability (autonomous damping) of each inertial system or each inertial system model, using differences of the similar data generated by the inertial systems or their models with different natural periods.

7. The method of generation of navigation parameters and position vertical according to claim 5, further comprising:

providing estimation of instrumental errors using differences of the similar data generated by inertial systems or their models with different natural periods, including different parameters n.

8. The method of generation of navigation parameters and position vertical according to claim 5, wherein:

accuracy of the vehicle heading generation is increased and the system readiness time is reduced due to increasing directing force to the compass meridian.

* * * * *